US010101938B2

(12) United States Patent
Camp et al.

(10) Patent No.: US 10,101,938 B2
(45) Date of Patent: Oct. 16, 2018

(54) DATA STORAGE SYSTEM SELECTIVELY EMPLOYING MULTIPLE DATA COMPRESSION TECHNIQUES (71) Applicant: INTERNATIONAL BUSINESS MACHINES CORPORATION, Armonk, NY (US)

(72) Inventors: Charles J. Camp, Sugar Land, TX (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 14/586,335

(22) Filed: Dec. 30, 2014

(65) Prior Publication Data
US 2016/0188212 A1    Jun. 30, 2016

(51) Int. Cl.
G06F 13/00    (2006.01)
G06F 3/06    (2006.01)

(52) U.S. Cl.
CPC ............ *G06F 3/064* (2013.01); *G06F 3/0608* (2013.01); *G06F 3/0613* (2013.01); *G06F 3/0688* (2013.01)

(58) Field of Classification Search
CPC ..... G06F 3/064; G06F 3/06087; G06F 3/0679
See application file for complete search history.

(56) References Cited

U.S. PATENT DOCUMENTS

| 7,051,126 | B1 * | 5/2006 | Franklin | G06F 13/122 709/247 |
| 7,822,939 | B1 | 10/2010 | Veprinsky et al. | |
| 8,407,191 | B1 | 3/2013 | Nanda | |
| 8,630,501 | B1 * | 1/2014 | Fram | H04N 19/40 382/232 |
| 8,806,292 | B2 | 8/2014 | Biran et al. | |
| 8,825,617 | B2 | 9/2014 | Haas et al. | |
| 2006/0002555 | A1 * | 1/2006 | Lekatsas | G06F 12/0802 380/269 |
| 2006/0114330 | A1 * | 6/2006 | Kuroiwa | G06T 1/20 348/207.99 |

(Continued)

FOREIGN PATENT DOCUMENTS

EP    000685824 A2    12/1995

*Primary Examiner* — Nanci N Wong
(74) *Attorney, Agent, or Firm* — Randall Bluestone; Brian F. Russell (57) ABSTRACT In a data storage system, a data set as compressed by a first compression technique (e.g., a hardware-based compression technique) is stored in non-volatile data storage in association with at least a particular address. In response to a subsequent garbage collection read of the particular address, control logic determines whether or not to compress the data set with a second compression technique (e.g., a software-based compression technique). In response to determining not to compress the data set with the second compression technique, the control logic writes the data set back to the non-volatile data storage as compressed by the first compression technique. In response to determining to compress the data set with the second compression technique, the control logic compresses the data set with the second compression technique and writes the data set back to the non-volatile data storage as compressed by the second compression technique.

19 Claims, 8 Drawing Sheets (56) References Cited

U.S. PATENT DOCUMENTS

| | | | |
|---|---|---|---|
| 2011/0004728 A1* | 1/2011 | Schuette | G06F 12/0868 711/113 |
| 2011/0055471 A1 | 3/2011 | Thatcher et al. | |
| 2012/0137054 A1 | 5/2012 | Sadri et al. | |
| 2012/0158647 A1* | 6/2012 | Yadappanavar | G06F 17/30153 707/609 |
| 2012/0185648 A1 | 7/2012 | Benhase et al. | |
| 2012/0260009 A1* | 10/2012 | Lu | G06F 3/0608 710/52 |
| 2013/0073798 A1* | 3/2013 | Kang | G06F 12/0246 711/103 |
| 2013/0159600 A1* | 6/2013 | Dror | G06F 12/0246 711/103 |
| 2013/0326115 A1 | 12/2013 | Goss et al. | |
| 2014/0188819 A1 | 7/2014 | Bagal et al. | |
| 2014/0214780 A1 | 7/2014 | Lange et al. | |
| 2014/0258648 A1 | 9/2014 | Yadav et al. | |
| 2014/0281216 A1 | 9/2014 | Danilak | |
| 2014/0282514 A1 | 9/2014 | Carson et al. | |
| 2014/0351229 A1* | 11/2014 | Gupta | G06F 17/30153 707/693 |
| 2015/0052395 A1* | 2/2015 | Wipfel | G06F 11/1451 714/19 |
| 2016/0371190 A1* | 12/2016 | Romanovskiy | G06F 3/067 |

\* cited by examiner

DATA STORAGE SYSTEM SELECTIVELY EMPLOYING MULTIPLE DATA COMPRESSION TECHNIQUES

BACKGROUND OF THE INVENTION

This disclosure relates to data processing and storage, and more specifically, to data storage systems, such as flash-based data storage systems, that selectively employ multiple data compression techniques.

NAND flash memory is an electrically programmable and erasable non-volatile memory technology that stores one or more bits of data per memory cell as a charge on the floating gate of a transistor. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

Data storage systems, including those employing NAND flash media, commonly employ data compression to increase the effective storage capacity of a given storage system. In general, conventional data storage systems have implemented either hardware-based data compression or software-based data compression. Generally, software-based data compression techniques can achieve higher compression ratios (i.e., smaller data sets) at lower performance in terms of bandwidth and throughput, while hardware-based data compression techniques provide lower compression ratios (i.e., larger data sets) at higher performance in terms of bandwidth and throughput. Given these alternatives, data storage system designers have been forced to choose between high compression strength and high performance for the design of a given storage system.

BRIEF SUMMARY

In at least one embodiment, in a data storage system, a data set as compressed by a first compression technique (e.g., a hardware-based compression technique) is stored in non-volatile data storage in association with at least a particular address. In response to a subsequent garbage collection read of the particular address, control logic determines whether or not to compress the data set with a second compression technique (e.g., a software-based compression technique). In response to determining not to compress the data set with the second compression technique, the control logic writes the data set back to the non-volatile data storage as compressed by the first compression technique. In response to determining to compress the data set with the second compression technique, the control logic compresses the data set with the second compression technique and writes the data set back to the non-volatile data storage as compressed by the second compression technique.

DETAILED DESCRIPTION

Figure 1A:
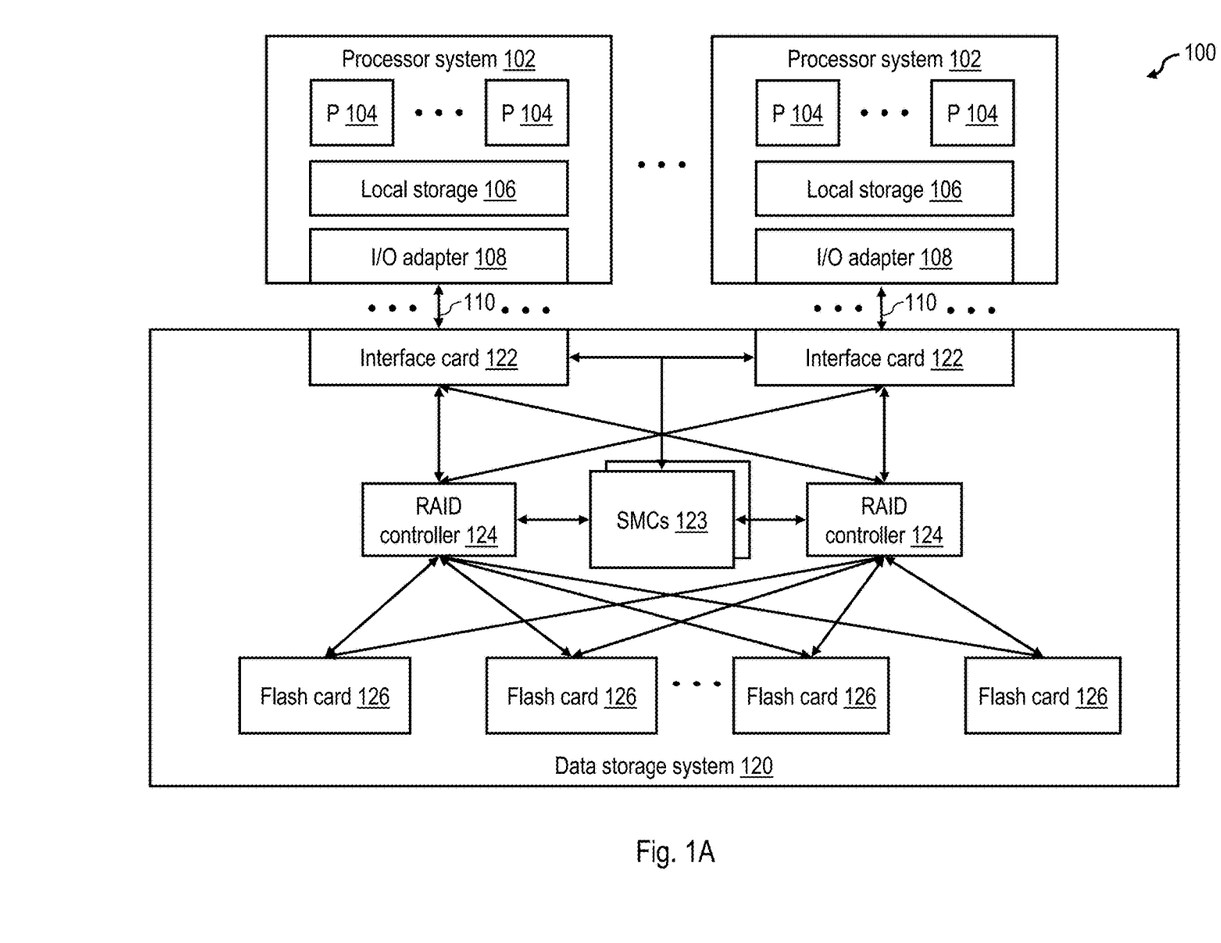
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. A processor system 102 may additionally include local storage 106 (e.g., dynamic random access memory (DRAM) or disks) that may store program code, operands and/or execution results of the processing performed by processor(s) 104. In various embodiments, a processor system 102 can be, for example, a mobile computing device (such as a smartphone or tablet), a laptop or desktop personal computer system, a server computer system (such as one of the POWER series of servers available from International Business Machines Corporation), or a mainframe computer system. A processor system 102 can also be an embedded processor system using various processors such as ARM, PowerPC, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, I/O channel 110 may employ any one or a combination of known or future developed communication protocols, including, for example, Fibre Channel (FC), FC over Ethernet (FCoE), Internet Small Computer System Interface (iSCSI), Infini-Band, Transport Control Protocol/Internet Protocol (TCP/IP), Peripheral Component Interconnect Express (PCIe), etc. I/O operations (IOPs) communicated via I/O channel 110 include read IOPs by which a processor system 102 requests data from data storage system 120 and write IOPs by which a processor system 102 requests storage of data in data storage system 120.

Although not required, in the illustrated embodiment, data storage system 120 includes multiple interface cards 122 through which data storage system 120 receives and responds to input/output operations (IOP) of hosts via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple flash cards 126 including, in this example, NAND flash storage media. In other embodiments, alternative and/or additional non-volatile storage devices can be employed.

In the depicted embodiment, the operation of data storage system 120 is managed by redundant system management controllers (SMCs) 123, which are coupled to interface cards 122 and RAID controllers 124. In various embodiments, system management controller 123 can be implemented utilizing hardware or hardware executing firmware and/or software.

Figure 1B:
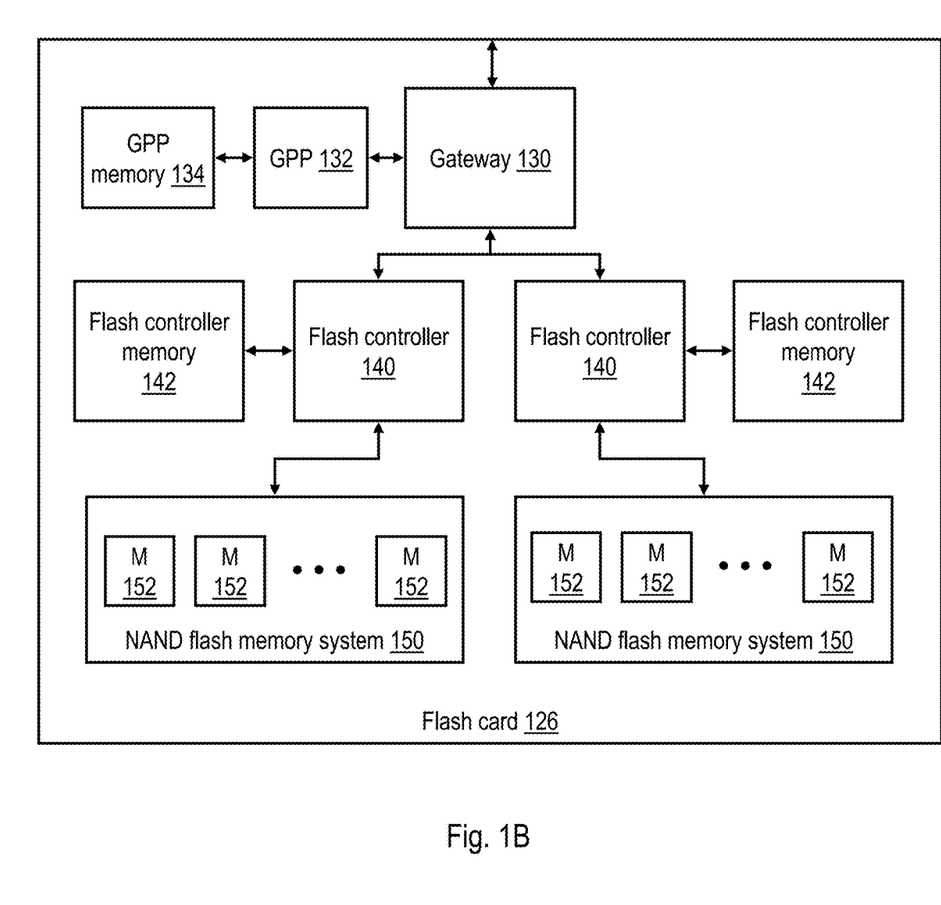
FIG. 1B is a more detailed block diagram of a flash card of the data storage system of FIG. 1A.

FIG. 1B depicts a more detailed block diagram of an exemplary embodiment of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform pre-processing on IOPs received by gateway 130 and/or to schedule servicing of the IOPs by flash card 126. GPP 132 is coupled to a GPP memory 134 (e.g., Dynamic Random Access Memory (DRAM)) that can conveniently buffer data created, referenced and/or modified by GPP 132 in the course of its processing or data flowing through the gateway 130 destined for one or more of the flash controllers 140.

Gateway 130 is further coupled to multiple flash controllers 140, each of which controls a respective NAND flash memory system 150. Flash controllers 140 can be implemented, for example, by an Application Specific Integrated Circuit (ASIC) and/or a Field Programmable Gate Array (FPGA) and/or a microprocessor, and each have an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOPs from gateway 130 that request to read data stored in NAND flash memory system 150 and/or to store data in NAND flash memory system 150. Flash controllers 140 service these IOPs, for example, by accessing NAND flash memory system 150 to read or write the requested data from or into NAND flash memory system 150 or by accessing a memory cache (not illustrated) associated with NAND flash memory system 150.

Flash controllers 140 implement a flash translation layer (FTL) that provides logical-to-physical address translation to enable access to specific memory locations within NAND flash memory systems 150. In general, an IOP received by flash controller 140 from a host device, such as a processor system 102, contains the logical block address (LBA) at which the data is to be accessed (read or written) and, if a write IOP, the write data to be stored to data storage system 120. The IOP may also specify the amount (or size) of the data to be accessed. Other information may also be communicated depending on the protocol and features supported by data storage system 120. The flash translation layer translates LBAs received from a RAID controller 124 into physical addresses assigned to corresponding physical location in NAND flash memory systems 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. In the embodiment shown in FIG. 1B, each NAND flash memory system 150 includes multiple (e.g., 32) individually addressable NAND flash memory storage devices 152. In the illustrated example, the flash memory storage devices 152 take the form of a board-mounted flash memory modules, for example, Single Level Cell (SLC), Multi-Level Cell (MLC), Three Level Cell (TLC), or Quad Level Cell (QLC) NAND flash memory modules.

Figure 2:
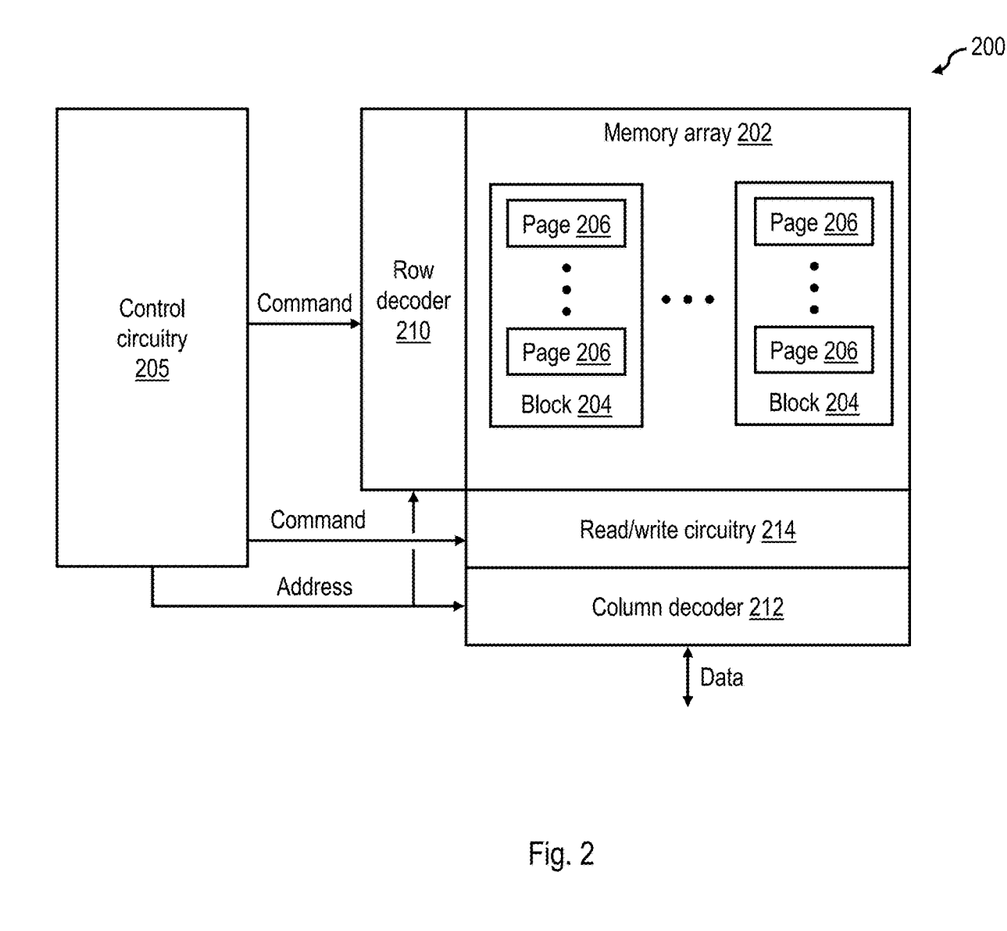
FIG. 2 depicts an exemplary NAND flash memory module in accordance with one embodiment.

Referring now to FIG. 2, there is depicted a block diagram of an exemplary flash memory module 200 that can be utilized to implement any of the NAND flash memory storage devices 152 of FIG. 1B. Flash memory module 200 includes one or more memory die, each implementing at least one memory array 202 formed of a two- or three-dimensional array of NAND flash memory cells. As indicated in FIG. 2, the memory cells within memory array 202 are physically arranged in multiple blocks 204, each in turn including multiple physical pages 206.

As is known to those skilled in the art, NAND flash memory, such as that employed in memory array 202, must be erased prior to being programmed. Further, NAND flash memory is generally constrained by its construction such that the smallest granule of storage that can be erased is a block 204 and the smallest granule of storage that can be accessed by a read or write IOP is fixed at the size of a single physical page 206. It should be appreciated in this regard that the LBAs provided by host devices correspond to logical pages within a logical address space, where each logical page typically has a size of 4 kilobytes (kB). Physical pages 206, in contrast, typically have a larger size, for example, 16 kB, and can thus correspond to multiple logical pages.

Flash memory module 200 further includes a row decoder 210 through which word lines of memory array 202 can be addressed and a column decoder 212 through which bit lines of memory array 202 can be addressed. In addition, flash memory module 200 includes read/write circuitry 214 that enables the memory cells of a physical page 206 to be programmed or read in parallel. Flash controller 200 additionally includes control circuitry 205 that provides chip-level control of operation of memory array 202, including read and write accesses made to physical pages 206 in memory array 202, erasure of blocks 204, and the amplitude, duration and polarity of related voltages applied to memory array 202.

Having described the general physical structure of one exemplary embodiment of a data storage system 120, certain operational aspects of data storage system 120 are now described with reference to FIG. 3, which is a high level flow diagram of the flash management functions and data structures employed by a GPP 132 and/or flash controller 140 in accordance with one embodiment.

Data storage system 120 does not generally allow external devices (e.g., hosts) to directly address and/or access the physical memory locations within NAND flash memory systems 150. Instead, data storage system 120 is generally configured to present to host devices one or more logical volumes each having a contiguous logical address space, thus allowing host devices to read and write data to and from LBAs within the logical address space while permitting one or more of the various levels of controllers (e.g., system management controller 123, RAID controllers 124, flash controllers 140 and GPP 132) to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 performs logical-to-physical address translation for an associated set of LBAs using a logical-to-physical address translation data structure, such as logical-to-physical translation (LPT) table 300, which can be stored, for example, in the associated flash controller memory 142. It should be noted that the logical address supplied to flash controller(s) 140 may be different from the logical address originally supplied to data storage system 120, since various components within data storage system 120 may perform address translation operations between the external devices and the flash controller(s) 140.

Flash management code running on the GPP 132 tracks erased blocks of NAND flash memory system 150 that are ready to be used in ready-to-use (RTU) queues 306, which may be stored, for example, in GPP memory 134. In the depicted embodiment, flash management code running on the GPP 132 maintains one RTU queue 306 per channel (i.e., per data bus), and an identifier of each erased block that is to be reused is enqueued in the RTU queue 306 corresponding to its channel. A build block stripes function 320 performed by flash management code running on the GPP 132 constructs new block stripes for storing data and associated parity information from the erased blocks enqueued in RTU queues 306. The new block stripes are then queued to the flash controller 140 for data placement. Block stripes are preferably formed of blocks residing in different channels, meaning that build block stripes function 320 can conveniently construct a block stripe by drawing each block of the new block stripe from a different RTU queue 306. In general, build block stripes function 320 attempts to construct stripes from blocks of approximately equal health (i.e., expected remaining useful life).

In response to write IOP received from a host, such as a processor system 102, a data placement function 310 of flash controller 140 determines by reference to LPT table 300 whether the target LBA(s) indicated in the write request is/are currently mapped to physical memory page(s) in NAND flash memory system 150 and, if so, changes the status of each data page currently associated with a target LBA to indicate that the associated data is no longer valid. In addition, data placement function 310 allocates a page stripe if necessary to store the write data of the write IOP and any non-updated data (i.e., for write requests smaller than a logical page, the remaining valid data from a previous write to the same logical address which is not being overwritten and which must be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The page stripe may be allocated from either a block stripe already allocated to hold data or from a new block stripe built by build block stripes function 320. In a preferred embodiment, the page stripe allocation can be based on the health of the blocks available for allocation and the "heat" (i.e., estimated or measured write access frequency) of the LBA of the write data. Data placement function 310 then writes the write data, associated metadata (e.g., cyclic redundancy code (CRC) and error correcting code (ECC) values), and parity information for the page stripe in the allocated page stripe. Flash controller 140 also updates LPT table 300 to associate the physical page(s) utilized to store the write data with the LBA(s) indicated by the host device. Thereafter, flash controller 140 can access the data to service host read IOPs by reference to LPT table 300 as further illustrated in FIG. 3.

Once all pages in a block stripe have been written, flash controller 140 places the block stripe into one of occupied block queues 302, which flash management code running on the GPP 132 utilizes to facilitate garbage collection. As noted above, through the write process, pages are invalidated, and therefore portions of the NAND flash memory system 150 become unused. The associated flash controller 140 (and/or GPP 132) eventually needs to reclaim this space through garbage collection performed by a garbage collector 312. Garbage collector 312 selects particular block stripes for garbage collection based on a number of factors including, for example, the health of the blocks 204 within the block stripes and how much of the data within the erase blocks 204 is invalid. In the illustrated example, garbage collection is performed on entire block stripes, and flash management code running on GPP 132 logs the block stripes ready to be recycled in a relocation queue 304, which can conveniently be implemented in the associated flash controller memory 142 or GPP memory 134.

The flash management functions performed by GPP 132 or flash controller 140 additionally include a relocation function 314 that relocates the data held in block stripes enqueued in relocation queue 304. To relocate such data, relocation function 314 updates LPT table 300 to remove the current association between the logical and physical addresses of the data. In addition, relocation function 314 issues relocation write requests to data placement function 310 to request that the valid data of the old block stripe be written to a new block stripe in NAND flash memory system 150. Once all remaining valid data has been moved from the old block stripe, the old block stripe is passed to dissolve block stripes function 316, which decomposes the old block stripe into its constituent blocks 204, thus disassociating the blocks 204. Each of the blocks 204 formerly forming the dissolved block stripe is then erased under the direction of flash controller 140 and/or the control circuitry 205 of the relevant flash memory module 200, and a corresponding program/erase (P/E) cycle count for each erased block is incremented. Based on the health metrics of each erased block 204 (e.g., bit error rate (BER) metrics, uncorrectable errors, P/E cycle count, etc.), each erased block 204 is either retired (i.e., withdrawn from use) by a block retirement function 318 among the flash management functions executed on GPP 132, or alternatively, prepared for reuse by placing the block 204 on the appropriate ready-to-use (RTU) queue 306 in the associated GPP memory 134.

Figure 3:
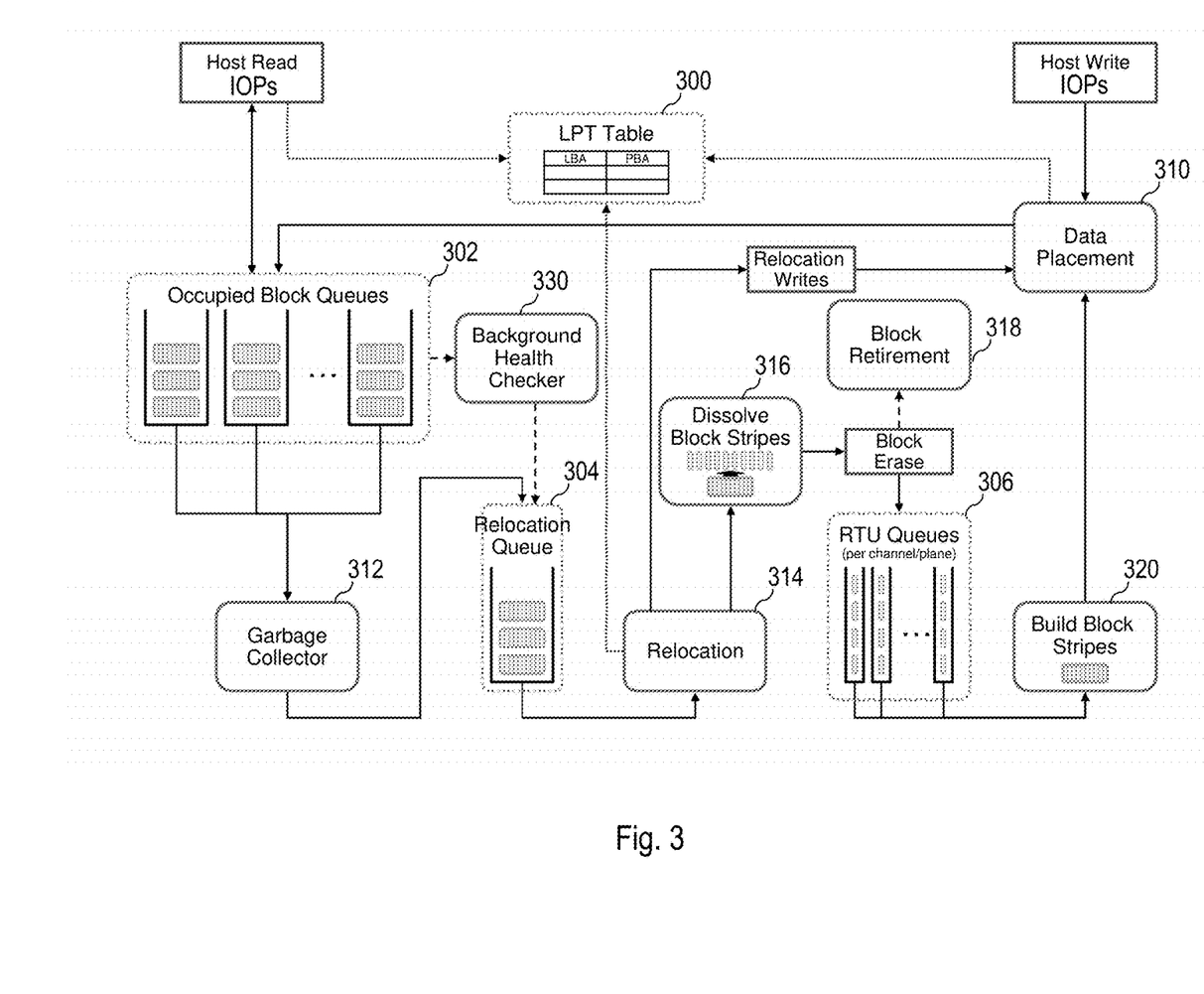
FIG. 3 is a high level flow diagram of the flash management functions and data structures employed in flash management in accordance with one embodiment.

As further shown in FIG. 3, the flash management functions executed on GPP 132 and/or flash controller 140 additionally include a background health checker 330. Background health checker 330, which operates independently of the read and write IOPs of hosts such as processor systems 102, continuously determines one or more metrics of health for blocks belonging to block stripes recorded in occupied block queues 302. Based on the one or more of the health metrics, background health checker 330 places block stripes on relocation queue 304 for handling by relocation function 314. Key health metrics preferably monitored and recorded by background health checker relate to the bit error rate (BER) metrics observed for valid blocks and physical pages, and may include, for example, the worst page BER of each block, the mean page BER of each block, the rates of change of the worst page BER and mean page BER of each block, etc. In order to obtain the most accurate health estimate possible, health can be determined from an analysis of valid and invalid data, thereby ensuring that blocks containing almost entirely invalid data are fully analyzed to determine overall block health.

In accordance with one aspect of the present disclosure, control logic of a NAND flash-based data storage system, such as data storage system 120 of FIG. 1A, can selectively employ multiple data compression techniques in order to provide both enhanced effective storage capacity and good storage system performance in terms of bandwidth and throughput. In various embodiments, the control logic may be implemented in hardware (i.e., integrated circuitry), which in some embodiments can be programmable, and/or through the execution of firmware and/or software. Further, the control logic can reside at and/or be distributed among a system level (e.g., in system management controllers 123), an intermediate level (e.g., in RAID controllers 124) and lower level (e.g., within flash cards 126).

Figure 4:
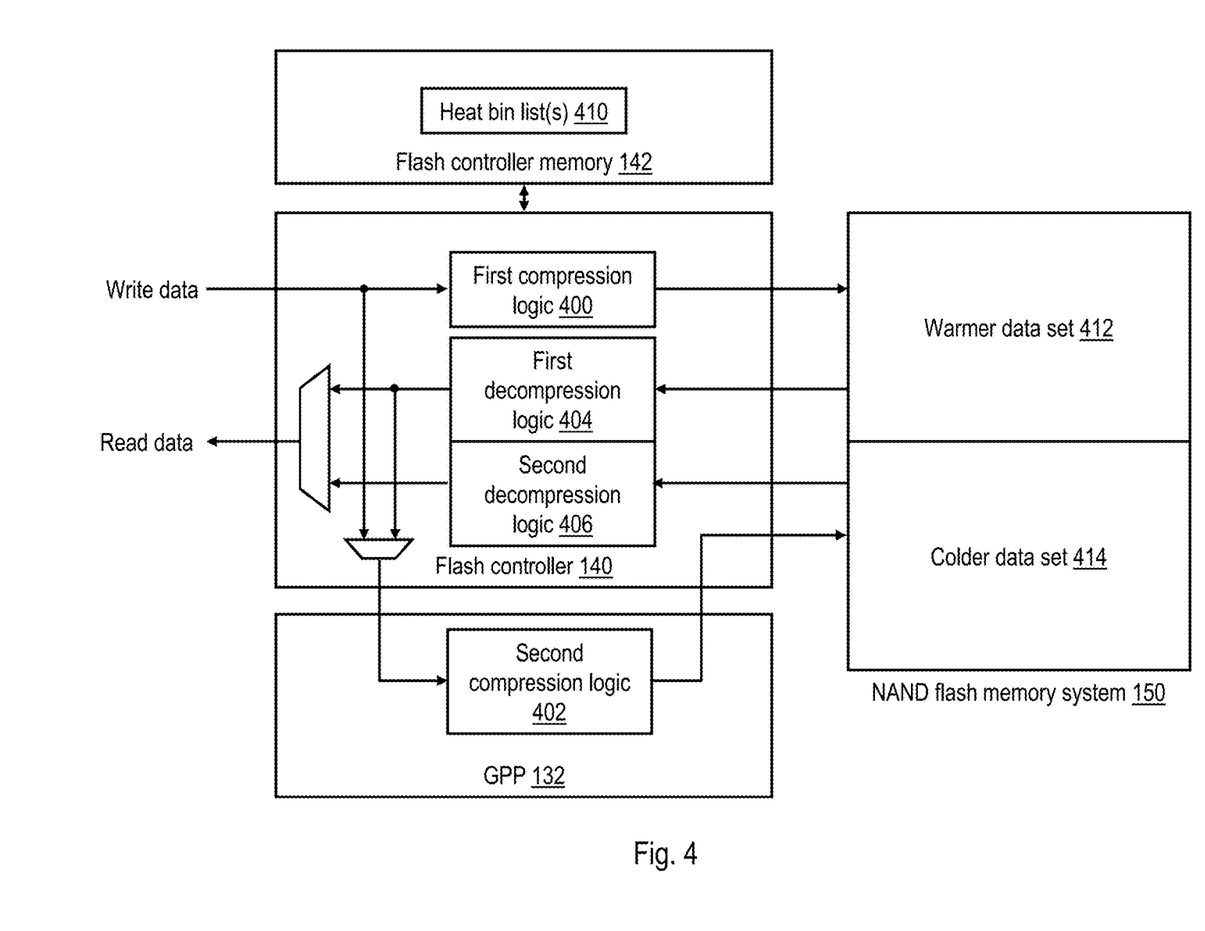
FIG. 4 illustrates a first exemplary allocation of the compression and decompression workload among the control logic of the exemplary storage system shown in FIGS. 1A-1B.
Figure 5:
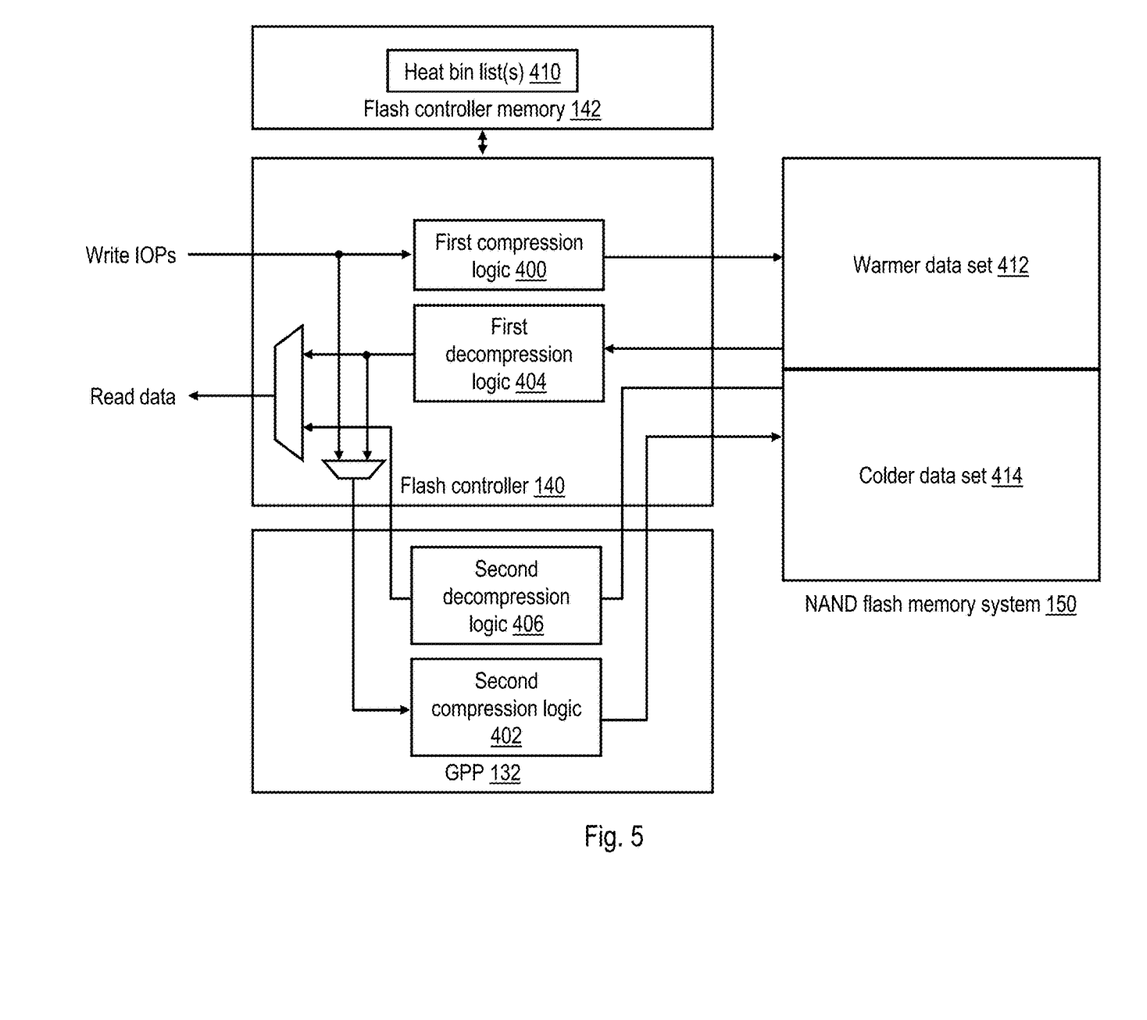
FIG. 5 depicts a second exemplary allocation of the compression and decompression workload among the control logic of the exemplary storage system shown in FIGS. 1A-1B.

Referring now to FIGS. 4-5, two exemplary allocations of the compression and decompression workload among the control logic of the exemplary storage system shown in FIGS. 1A-1B are given. In the embodiments illustrated in FIGS. 4-5, the control logic responsible for data compression and decompression is implemented within flash cards 126 in a combination of hardware within flash controller 140 and program code (i.e., firmware and/or software) executed by GPP 132.

As illustrated, the control logic includes first compression logic 400, which implements a first compression technique, and second compression logic 402, which implements a second compression technique different form the first compression technique. By virtue of its implementation in hardware, first compression logic 400 provides higher performance than second compression logic 402, which is implemented in program code. However, in many if not all implementations, second compression logic 402 provides a higher compression ratio than first compression logic 400, and thus produces a smaller output data set. The first compression logic 400 and second compression logic 402 can be employed, for example, as part of data placement function 310 depicted in FIG. 3.

The control logic further includes first decompression logic 404 and second decompression logic 406, which are utilized to decompress data compressed utilizing the first and second compression techniques, respectively. In the embodiment of FIG. 4, both first decompression logic 404 and second decompression logic 406 are implemented in hardware within flash controller 140, which generally supports lower response times for read IOPs than software-based implementations. However, it should be understood that one or both of first decompression logic 404 and second decompression logic 406 can alternatively be implemented in program code. For example, FIG. 5 illustrates one alternative embodiment in which first decompression logic 404 is implemented in hardware within flash controller 140, and second decompression logic 406 is implemented by program code executed by GPP 132.

In some embodiments, the first and second compression techniques implemented by first compression logic 400 and second compression logic 402 are alternative techniques, and the control logic utilizes first decompression logic 404 to decompresses data compressed utilizing the first compression technique prior to the application of the second compression technique. In alternative embodiments, the first and second compression techniques can be applied in combination, meaning that data as compressed by first compression logic 400 utilizing the first compression technique can be fed directly to second compression logic 402 for further compression utilizing the second compression technique. Further, in some embodiments, more than two compression/decompression techniques can be employed individually or in combination.

The control logic preferably records and maintains metadata that specifies an observed write access frequency (defined herein as "heat" or "temperature") for LBAs served by its particular flash card 126. In the embodiments depicted in FIGS. 4-5, flash controller 140 maintains this temperature metadata in one or more heat bin lists (HBLs) 410 in flash controller memory 142. For example, in one implementation, four heat bins are defined that respectively correspond to the coldest LBA ranges (i.e., those having least frequent write accesses), cool LBA ranges, warm LBA ranges and hot LBA ranges (i.e., those having the most frequent write accesses), and flash controller 140 tracks the relative temperature of each LBA range by placing it on the corresponding HBL 410. In other implementations, the temperature metadata can be recorded in another control data structure, such as LPT table 300, or in metadata recorded in memory array 202 in conjunction with the data itself. Of course, in other implementations, a greater or lesser number of heat bins can be used.

In a preferred embodiment, in response to receiving a write IOP requesting data associated with a target LBA to be written to NAND flash memory system 150, the control logic, in the absence of any a priori knowledge of the heat of the target LBA, assumes that the target LBA belongs to a warmer data set 412 including data corresponding to warm and hot LBA ranges. Accordingly, the control logic employs first compression logic 400 (i.e., a hardware-based compression technique) to apply a moderate amount of compression to the write data at very high speed and then writes the write data, as compressed by the first compression technique, to NAND flash memory system 150.

Subsequently, the control logic can employ criteria such as data write temperature and/or compressibility (e.g., based on data entropy analysis) to determine whether alternative or additional compression can be advantageously employed to further compress the data associated with the target LBA. In particular, the control logic preferably determines whether to perform alternative or additional compression during garbage collection operations given that data must be read from and rewritten to NAND flash memory system 150 as part of the garbage collection operations, as described above. In response the control logic determining that the data is further compressible and is sufficiently cold when read for garbage collection (e.g., the data is associated with a cool or cold LBA range), the control logic further compresses the data employing an alternative or additional second data compression technique provided by second compression logic 402 prior to writing the data back to NAND flash memory system 150 as part of colder data set 414 (which includes data associated with both cool and cold LBA ranges). Thus, the control logic optimizes compression of data that is likely to be long-lived in data storage system 120, without expending effort to compress data that is not very compressible or that is likely to be overwritten in the near future.

Figure 6A:
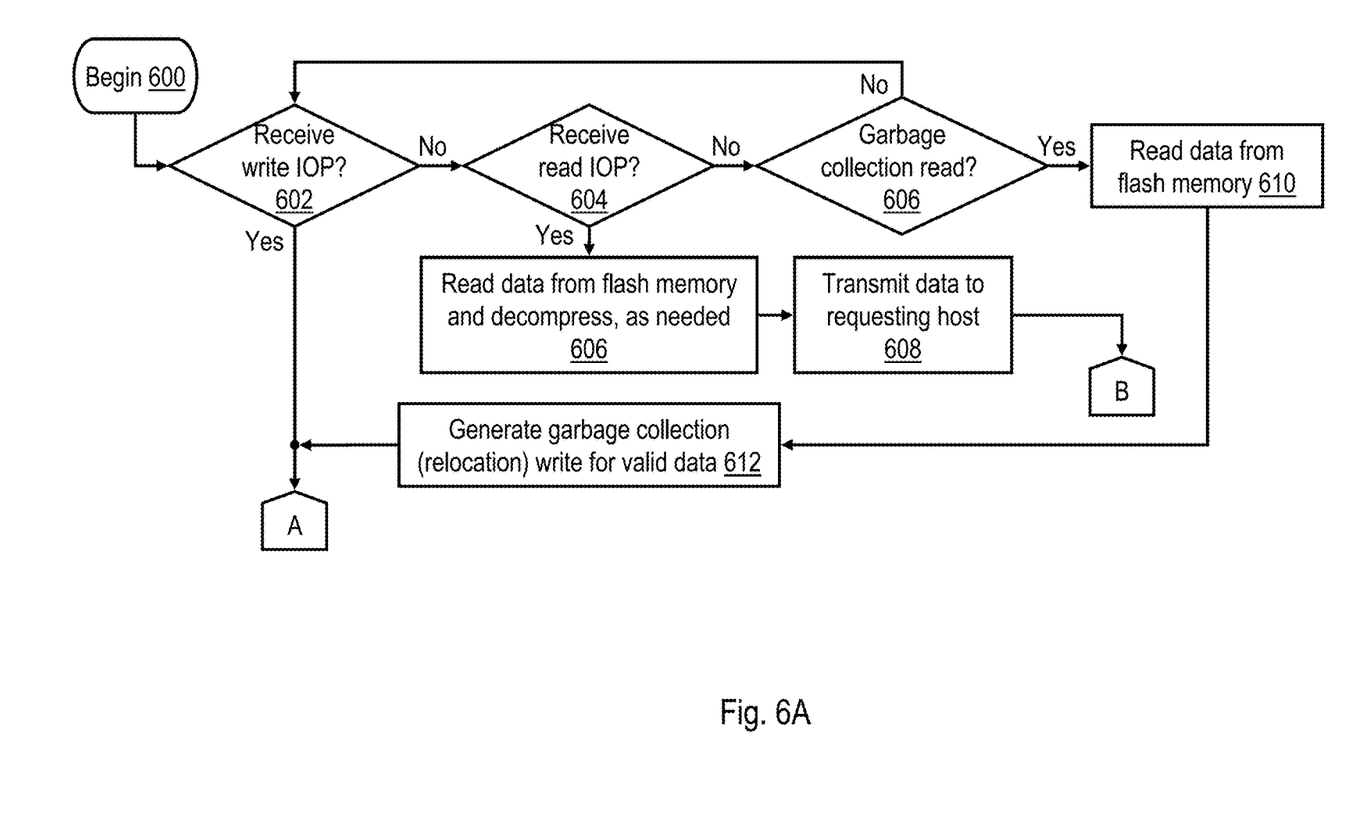
FIGS. 6A-6B together form a high level logical flowchart of an exemplary process for selectively compressing data in a NAND flash data storage system in accordance with one embodiment.
Figure 6B:
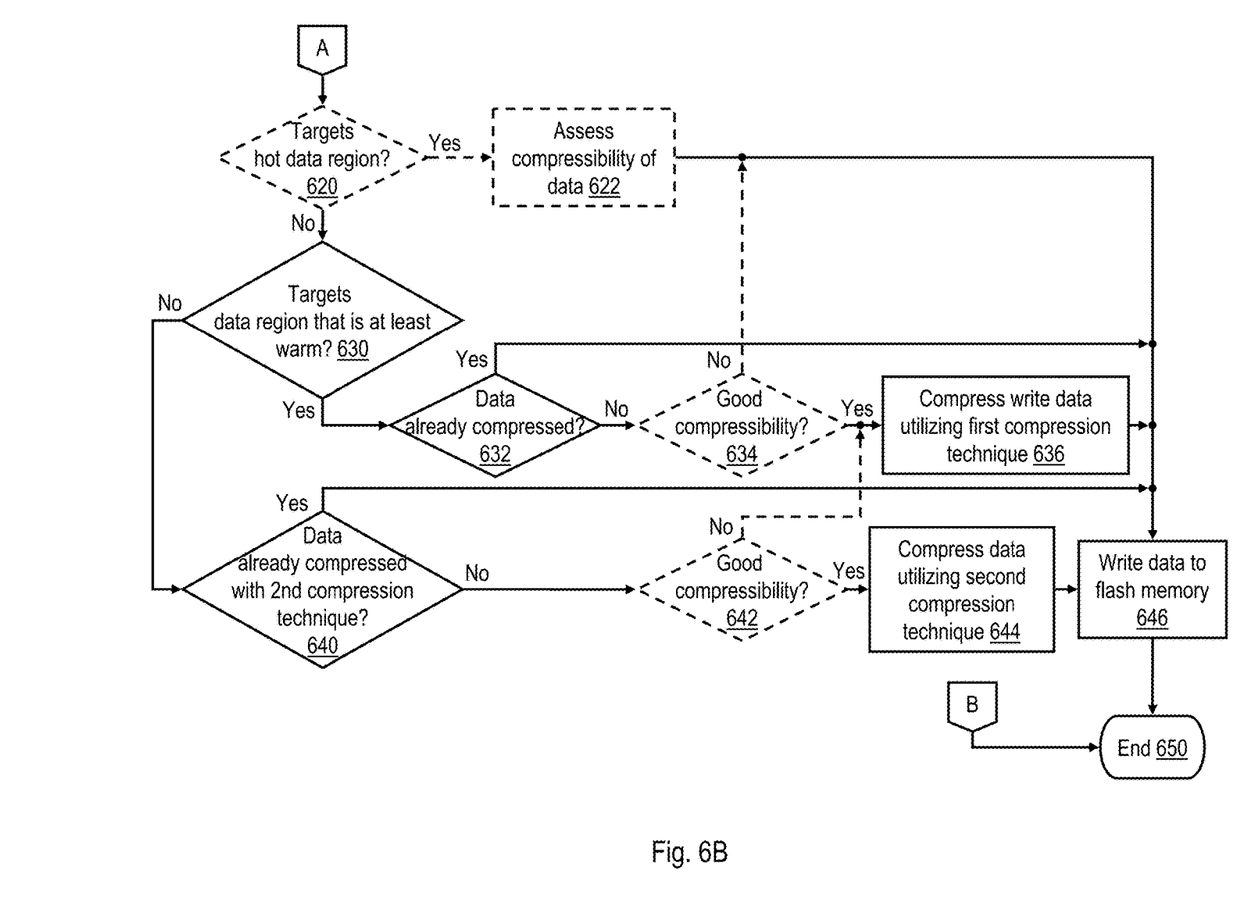

Referring now to FIGS. 6A-6B, a high level logical flowchart of a exemplary process for performing data compression in a NAND flash data storage system in accordance with one embodiment is depicted. The illustrated process can be performed, for example, by control logic of a NAND flash memory system 150, such as the GPP 132 and/or flash controller 140 of a flash card 126.

The process begins at block 600 and then proceeds to blocks 602-606, which illustrates the control logic monitoring to detect receipt of read or write requests, including a write IOP of a host (block 602), a read IOP of a host (block 604) and an internally generated garbage collection read of garbage collector function 312 (block 606). In response to detecting receipt of a write IOP from a host at block 602, the process passes through page connector A to block 620 of FIG. 6B, which is described below. In response to detecting receipt of a read IOP at block 604 of FIG. 6A, the control logic reads the requested data from NAND flash memory system 150 and decompresses the requested data as needed to obtain uncompressed data utilizing first decompression logic 404 and/or second decompression logic 406 (block 606). The control logic then transmits the requested data to the requesting host (block 608). Thereafter, the process passes through page connector B and terminates at block 650 of FIG. 6B.

Returning to FIG. 6A, in response to detection of an internally generated garbage collection read by garbage collector function 312 at block 606, the process proceeds to blocks 610-612. Block 610 illustrates the control logic reading the data specified by the garbage collection read (e.g., a block stripe) from NAND flash memory system 150. In addition, at block 612, the control logic generates one or more garbage collection (relocation) writes for the still valid data within the page stripe, as described above with respect to relocation function 314. The process then passes through page connector A to block 620 of FIG. 6B.

Referring now to FIG. 6B, block 620 is an optional block illustrating the control logic determining whether or not a write data of the write IOP or relocation write is associated with an LBA in a hot data region (e.g., is on the hot heat bin list 410). In this embodiment, in response to determining that the write data is associated with an LBA in a hot data region, the control logic writes the write data to NAND flash memory system 150 at block 646 in uncompressed form. In some embodiments, the control logic may further analyze the write data, as shown at optional block 622, to assess its compressibility, for example, utilizing an entropy analysis. In some embodiments, the control logic may additionally write data to NAND flash memory system 150 in uncompressed form if the heat and/or compressibility is unknown, which would be the case, for example, if a write IOP is the first write to a given target LBA.

In response to a negative determination at block 620 or if block 620 is omitted, the process passes to block 630, which illustrates the control logic determining whether or not the write data of the write IOP or relocation write is associated with an LBA in a warm data region (or if block 620 is omitted, a warm or hot data region). If not, meaning that the write data is associated with an LBA in a cool or cold data region, the process passes to block 640, which is described below. However, in response to a determination at block 630 that the write data is associated with a target LBA in a warm or hot data region (or in some embodiments if the write temperature of the target LBA is unknown), the control logic determines at block 632 whether or not the data is already compressed, for example, because the write data was previously stored in NAND flash memory 150 in compressed form and is to be rewritten into NAND flash memory system 150 as part of a garbage collection operation. The determination of whether or not the data is compressed can be made, for example, by examining the relevant page headers. In response to a determination at block 632 that the data is already compressed, the process passes from block 632 to block 646, which illustrates the control logic storing the data in compressed form into NAND flash memory system 150.

In response to a negative determination at block 632, the control logic may optionally further determine at block 634 whether the uncompressed write data is sufficiently compressible with the first compression technique to warrant compression processing by first compression logic 400. In response to a negative determination at block 634, the process passes directly to block 646, which depicts the control logic writing the write data into NAND flash memory system 150 in uncompressed form. If, however, the control logic makes an affirmative determination at block 634 (or if block 634 is omitted), the control logic employs first compression logic 400 to compresses the write data utilizing the first compression technique (block 636). Thereafter, at block 646, the control logic writes the write data as compressed by the first compression technique into NAND flash memory system 150.

Referring now to block 640, the control logic determines if the write data, which is associated with a target LBA known to be in a cool or cold data region, is already compressed utilizing the second compression technique applied by second compression logic 402, for example, because the write data was previously stored in NAND flash memory 150 in compressed form and is to be rewritten into NAND flash memory system 150 as part of a garbage collection operation. If so, the process passes from block 640 to block 646, which illustrates the control logic storing the data as compressed by the second compression technique into NAND flash memory system 150. However, in response to a negative determination at block 640, the control logic may optionally further determine at block 642 whether the write data, which may be either uncompressed or compressed by the first compression technique, is sufficiently compressible with the second compression technique to warrant compression processing by second compression logic 402. In response to a negative determination at optional block 642, the control logic may either compress the write data utilizing the first compression technique, as shown at block 636, or alternatively omit compression of the write data. In either case, the process passes to block 646, which depicts the control logic writing the write data into NAND flash memory system 150 following compression, if any. If, however, the control logic makes an affirmative determination at block 642 (or if block 642 is omitted), the control logic second employs compression logic 402 to compress the write data utilizing the second compression technique (block 644). It should be noted that in some embodiments, data compressed by first compression logic 400 utilizing the first compression technique must be decompressed prior to compression of the data by second compression logic 402. In such embodiments, the processing illustrates at block 644 includes, as a preparatory step, the decompression of the data by first decompression logic 404. Thereafter, at block 646, the control logic writes the write data as compressed by the second compression technique into NAND flash memory system 150. Following block 646, the process of FIG. 6B ends at block 650.

It should be noted that in some embodiments, alternative or additional criteria may be employed in the process of FIG. 6B to determine whether to apply compression to data being relocated through garbage collection and, if so, to determine which compression technique should be applied. For example, one such criteria could be the health of the target block and/or block stripe to which the data is to be relocated by relocation function 314. For example, in one embodiment, no compression or a weaker compression technique (e.g., the first compression technique) is employed for target blocks that are less healthy according to one or more health metrics and a stronger compression technique (e.g., the second compression technique) is employed for target blocks that are more healthy according to one or more health metrics.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, in at least one embodiment, a data set as compressed by a first compression technique (e.g., a hardware-based compression technique) is stored in nonvolatile data storage in association with at least a particular address. In response to a subsequent garbage collection read of the particular address, control logic determines whether or not to compress the data set with a second compression technique (e.g., a software-based compression technique). In response to determining not to compress the data set with the second compression technique, the control logic writes the data set back to the non-volatile data storage as compressed by the first compression technique. In response to determining to compress the data set with the second compression technique, the control logic compresses the data set with the second compression technique and writes the data set back to the non-volatile data storage as compressed by the second compression technique.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transitory propagating media per se.

In addition, although embodiments have been described that include use of a NAND flash memory, it should be appreciated that embodiments of the present invention can also be used with any other type of non-volatile random access memory (NVRAM).

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method in a data storage system, the method comprising:
   in response to an initial write of a data set to non-volatile data storage, storing the data set as compressed by a first compression in the non-volatile data storage in association with at least a particular address;
   in response to a subsequent garbage collection read of the particular address, determining whether or not to compress the data set with an additional second compression technique different than the first compression technique that produces a smaller compressed data set, wherein the determining includes determining if the particular address is a more frequently written address or a less frequently written address;
   in response to determining that the particular address is a more frequently written address, writing the data set back to the non-volatile data storage as compressed by the first compression technique;
   determining compressibility of the data set using entropy analysis; and
   in response to determining that the particular address is a less frequently written address and the entropy analysis indicates the data set is further compressible, compressing the data set with the second compression technique and writing the data set back to the non-volatile data storage as compressed by the second compression technique.

2. The method of claim 1, wherein:
   the first compression technique comprises a hardware-implemented compression technique;
   the second compression technique comprises a software-implemented compression technique; and
   the second compression technique produces a smaller compressed data set than the first compression technique.

3. The method of claim 1, wherein determining whether or not to compress the data set with the additional second compression technique further includes determining whether or not to compress the data set based at least on a write temperature of the data set.

4. The method of claim 3, wherein determining whether or not to compress the data set with the additional second compression technique further includes determining whether or not to compress the data set based on compressibility of the data set.

5. The method of claim 1, and further comprising:
   in response to the garbage collection read, decompressing the data set.

6. A controller for a data storage system, comprising:
   an integrated circuit including control logic configured to be coupled to non-volatile data storage, wherein the control logic is configured to perform:
   in response to an initial write of a data set to non-volatile data storage, storing the data set as compressed by a first compression in the non-volatile data storage in association with at least a particular address;
   in response to a subsequent garbage collection read of the particular address, determining whether or not to compress the data set with an additional second compression technique different than the first compression technique that produces a smaller compressed data set, wherein the determining includes determining if the particular address is a more frequently written address or a less frequently written address;
   in response to determining that the particular address is a more frequently written address, writing the data set back to the non-volatile data storage as compressed by the first compression technique;
   determining compressibility of the data set using entropy analysis; and
   in response to determining that the particular address is a less frequently written address and the entropy analysis indicates the data set is further compressible, compressing the data set with the second compression technique and writing the data set back to the non-volatile data storage as compressed by the second compression technique.

7. The controller of claim 6, wherein:
the first compression technique comprises a hardware-implemented compression technique;
the second compression technique comprises a software-implemented compression technique; and
the second compression technique produces a smaller compressed data set than the first compression technique.

8. The controller of claim 6, wherein determining whether or not to compress the data set with the addtional second compression technique further includes determining whether or not to compress the data set based at least on a write temperature of the data set.

9. The controller of claim 8, wherein determining whether or not to compress the data set with the additional second compression technique further includes determining whether or not to compress the data set based on compressibility of the data set.

10. The controller of claim 6, wherein the control logic is further configured to perform:
in response to the garbage collection read, decompressing the data set.

11. A data storage system, comprising the integrated circuit of claim 6 coupled to the non-volatile data storage.

12. A program product, comprising:
a storage device; and
program code stored in the storage device, wherein the program code, when executed by a control logic, causes the control logic to perform:
  in response to an initial write of a data set to non-volatile data storage, storing the data set as compressed by a first compression in the non-volatile data storage in association with at least a particular address;
  in response to a subsequent garbage collection read of the particular address, determining whether or not to compress the data set with an additional second compression technique different than the first compression technique that produces a smaller compressed data set, wherein the determining includes determining if the particular address is a more frequently written address or a less frequently written address;
  in response to determining that the particular address is a more frequently written address, writing the data set back to the non-volatile data storage as compressed by the first compression technique;
  determining compressibility of the data set using entropy analysis; and
  in response to determining that the particular address is a less frequently written address and the entropy analysis indicates the data set is further compressible, compressing the data set with the second compression technique and writing the data set back to the non-volatile data storage as compressed by the second compression technique.

13. The program product of claim 12, wherein:
the first compression technique comprises a hardware-implemented compression technique;
the second compression technique comprises a software-implemented compression technique; and
the second compression technique produces a smaller compressed data set than the first compression technique.

14. The program product of claim 12, wherein determining whether or not to compress the data set with the additional second compression technique further includes determining whether or not to compress the data set based at least on a write temperature of the data set.

15. The program product of claim 14, wherein determining whether or not to compress the data set with the additional second compression technique further includes determining whether or not to compress the data set based on compressibility of the data set.

16. The program product of claim 12, wherein the program code further causes the control logic to perform:
in response to the garbage collection read, decompressing the data set.

17. The method of claim 2, and further comprising:
after writing the data set back to the non-volatile data storage as compressed by the second compression technique and in response to a read request, reading the data set as compressed by the second compression technique from the non-volatile storage, decompressing the data set utilizing a hardware-implemented decompression technique, and transmitting the data set as decompressed.

18. The controller of claim 7, wherein the control logic is further configured to perform:
after writing the data set back to the non-volatile data storage as compressed by the second compression technique and in response to a read request, reading the data set as compressed by the second compression technique from the non-volatile storage, decompressing the data set utilizing a hardware-implemented decompression technique, and transmitting the data set as decompressed.

19. The program product of claim 13, wherein the program code, when executed by a control logic, causes the control logic to perform:
after writing the data set back to the non-volatile data storage as compressed by the second compression technique and in response to a read request, reading the data set as compressed by the second compression technique from the non-volatile storage, decompressing the data set utilizing a hardware-implemented decompression technique, and transmitting the data set as decompressed.

* * * * *